(12) United States Patent
Neal et al.

(10) Patent No.: US 9,636,733 B2
(45) Date of Patent: May 2, 2017

(54) METHOD AND APPARATUS FOR FORMING A HELICAL TUBE BUNDLE

(71) Applicant: Neal Technologies IP holdings LLC, Mesa, AZ (US)

(72) Inventors: Kennieth Neal, Mesa, AZ (US); Eugene Neal, Phoenix, AZ (US); Eric Wilderson, Medford, OR (US); James Cunningham, Mesa, AZ (US)

(73) Assignee: Neal Technologies IP Holdings, LLC, Mesa, AZ (US)

( * ) Notice: Subject to any disclaimer, the term of this patent is extended or adjusted under 35 U.S.C. 154(b) by 0 days.

(21) Appl. No.: 14/941,018

(22) Filed: Nov. 13, 2015

(65) Prior Publication Data
US 2016/0082556 A1    Mar. 24, 2016

Related U.S. Application Data

(63) Continuation-in-part of application No. 14/493,898, filed on Sep. 23, 2014, now Pat. No. 9,517,500.

(51) Int. Cl.
| | |
|---|---|
| *B23P 15/26* | (2006.01) |
| *B21D 11/06* | (2006.01) |
| *B21D 7/08* | (2006.01) |
| *B21D 39/04* | (2006.01) |
| *B21D 53/02* | (2006.01) |
| *B21D 53/06* | (2006.01) |

(52) U.S. Cl.
CPC ............... *B21D 11/06* (2013.01); *B21D 7/08* (2013.01); *B21D 39/04* (2013.01); *B21D 53/027* (2013.01); *B21D 53/06* (2013.01); *B23P 15/26* (2013.01)

(58) Field of Classification Search
CPC . B21D 7/08; B21D 9/10; B21D 11/06; B21D 11/10; B21D 11/14; B21D 39/04; B21D 53/02; B21D 53/027; B21D 53/06; B21F 3/02; B21F 3/12; B21F 7/00; B21F 15/02; B21F 15/04; H01B 13/0207;
(Continued)

(56) References Cited

U.S. PATENT DOCUMENTS

| | | |
|---|---|---|
| 300,741 A | 6/1884 | Spruce |
| 1,148,121 A | 7/1915 | Porter |
| (Continued) | | |

*Primary Examiner* — Peter DungBa Vo
*Assistant Examiner* — Joshua D Anderson
(74) *Attorney, Agent, or Firm* — Hartman Titus PLC; John D. Titus

(57) ABSTRACT

Apparatus and method for forming a plurality of elongate members into a helical bundle. The apparatus has a plurality of bending die heads that are mounted in a circular array within a rigid housing. The bending die heads each have a pair of grooved rollers that engage the sides of the tubes to apply a bending force while allowing the tubes to move longitudinally through the bending die stock. The bending die heads can be rotated about their longitudinal axes to impart a helical twist to the tubes as they pass through the bending die stock. The apparatus also has a collet stock assembly, which consists of a collet that has a plurality of apertures equal to the number of tubes in the bundle to be formed. The collet stock is mounted to a housing that is secured to a carriage. The carriage is driven by motor and lead screw to move linearly along a track toward and away from the bending die stock while the collet is rotated at a predetermined speed to form a helical bundle.

6 Claims, 9 Drawing Sheets

(58) Field of Classification Search
CPC ............ H01B 13/0214; H01B 13/0221; H01B 13/0228; B21C 37/06–37/30; B23P 15/26
USPC ......... 72/49, 50, 64, 65, 86–90, 95, 96, 100, 72/110, 135, 137, 141, 142, 299, 369, 72/371; 29/727, 890.032, 890.037; 140/118, 119
See application file for complete search history.

(56) References Cited

U.S. PATENT DOCUMENTS

| | | | | |
|---|---|---|---|---|
| 2,437,500 A * | 3/1948 | Bruegger | ................ | B21C 37/26 29/890.048 |
| 2,724,944 A | 11/1955 | Carleton | | |
| 2,815,790 A * | 12/1957 | Mayrath | ................ | B21D 11/06 29/598 |
| 3,370,622 A * | 2/1968 | Marks | ....................... | B21F 7/00 140/149 |
| 3,415,092 A * | 12/1968 | Dean | ..................... | B21C 37/124 72/144 |
| 3,648,506 A * | 3/1972 | Caltagirone | .......... | H01F 41/077 140/92.2 |
| 3,750,720 A * | 8/1973 | Steigerwald | ........... | H01B 13/02 140/149 |
| 4,402,205 A * | 9/1983 | Yakovlev | .................. | B21F 3/04 72/138 |
| 4,606,209 A * | 8/1986 | Eisinger | ................ | B21D 11/06 72/135 |
| 4,757,700 A * | 7/1988 | Dotti | ....................... | B21C 37/12 72/371 |
| 4,843,713 A | 7/1989 | Langner | | |
| 4,865,081 A | 9/1989 | Neumann | | |
| 5,052,450 A | 10/1991 | Williams | | |
| 5,465,597 A * | 11/1995 | Bajraszewski | ............. | B21J 5/12 29/893.34 |
| 7,165,605 B2 * | 1/2007 | Park | ..................... | F28D 7/0008 165/140 |
| 7,458,242 B2 | 12/2008 | Rataj | | |
| 2011/0011572 A1 | 1/2011 | Nagurny | | |
| 2013/0062821 A1 * | 3/2013 | Eto | ......................... | F16F 1/047 267/180 |
| 2013/0277022 A1 * | 10/2013 | Neal | ........................ | F28F 9/00 165/163 |

* cited by examiner

METHOD AND APPARATUS FOR FORMING A HELICAL TUBE BUNDLE

BACKGROUND OF THE INVENTION

This invention relates generally to methods and devices used for forming elongate wire, rod, tubing and the like into shapes, in particular forming wire or tubing into helical shapes.

As disclosed in WO 2013/158916 the contents of which are incorporated herein by reference, a heat exchanger in which the heat exchanger tubes are formed into helical tube bundles has significant advantages over straight-tube heat exchangers in terms of durability, size and thermal efficiency.

Apparatus and methods for forming a single rod of wire or tube into a helical shape are well known. U.S. Pat. No. 4,402,205 to Yakovlev et al. discloses various methods for forming helical springs by winding a resilient rod around a rotating mandrel. U.S. Pat. No. 4,606,209 to Eisinger discloses a disk roller mechanism for forming a wire into a helical shape in which the wire is drawn through a plurality of staggered disk-shaped forming rollers while the wire is also being rotated about its own axis. Although the prior art discloses numerous methods of forming a single wire into a helix, or multiple thin strands into wire rope, the prior art does not disclose a method and apparatus for simultaneously forming a plurality of tubes or rigid rods into a helical bundle.

SUMMARY OF THE INVENTION

The present invention comprises an apparatus and method for forming a plurality of rigid or semi-rigid elongate members, for example a plurality of stainless steel tubes, into a helical bundle. According to an illustrative embodiment the apparatus has a plurality of bending die heads that are mounted in a circular array within a rigid housing. The bending die heads each have a pair of grooved rollers that engage the sides of the tubes to apply a bending force while allowing the tubes to move longitudinally through the bending die stock. The bending die heads can be rotated about their longitudinal axes to impart a helical twist to the tubes as they pass through the bending die stock. The bending die heads are rotated preferably in unison by means of a ring gear that engages a pinion gear attached to the shank of each of the bending die heads.

The illustrative embodiment also has a collet stock assembly, which consists of a collet that has a plurality of apertures equal to the number of tubes in the bundle to be formed. A pneumatic ram closes the collet against a tapered sleeve to grip the tubes in a manner similar to the collet of an engine lathe. The collet stock is mounted to a housing that is secured to a carriage. The carriage is driven by motor and lead screw to move linearly along a track toward and away from the bending die stock. The collet stock also includes a motor that engages a gear to rotate the collet at a predetermined speed.

In operation, with the tubes firmly held by the collet a central mandrel is optionally inserted between the tubes. The bending die heads are then rotated by the ring gear to form the desired helical angle as the collet rotates and moves away from the bending die stock to form the beginning lead-in of the helix. Once the lead-in of the helix is established, the collet begins to rotate at the appropriate angular velocity to continue the helix as the collet stock moves further away from the bending die stock. Finally, once the helical bundle has been formed to the appropriate length, the bending die heads are rotated by the ring gear back to parallel to form the ending lead-out of the helix. This process yields a helical bundle having a short parallel bundle at each end to facilitate assembly to an end cap of a heat exchanger assembly, such as an EGR cooler.

The pitch (helical angle) of the tube bundle can be controlled by varying the angular orientation of the bending die heads and varying the speed of advancement of the carriage relative to the rotation of the collet. The helical radius of the tube bundle can be adjusted by altering the radial position of the grooved rollers and by use of a center mandrel of different diameter.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
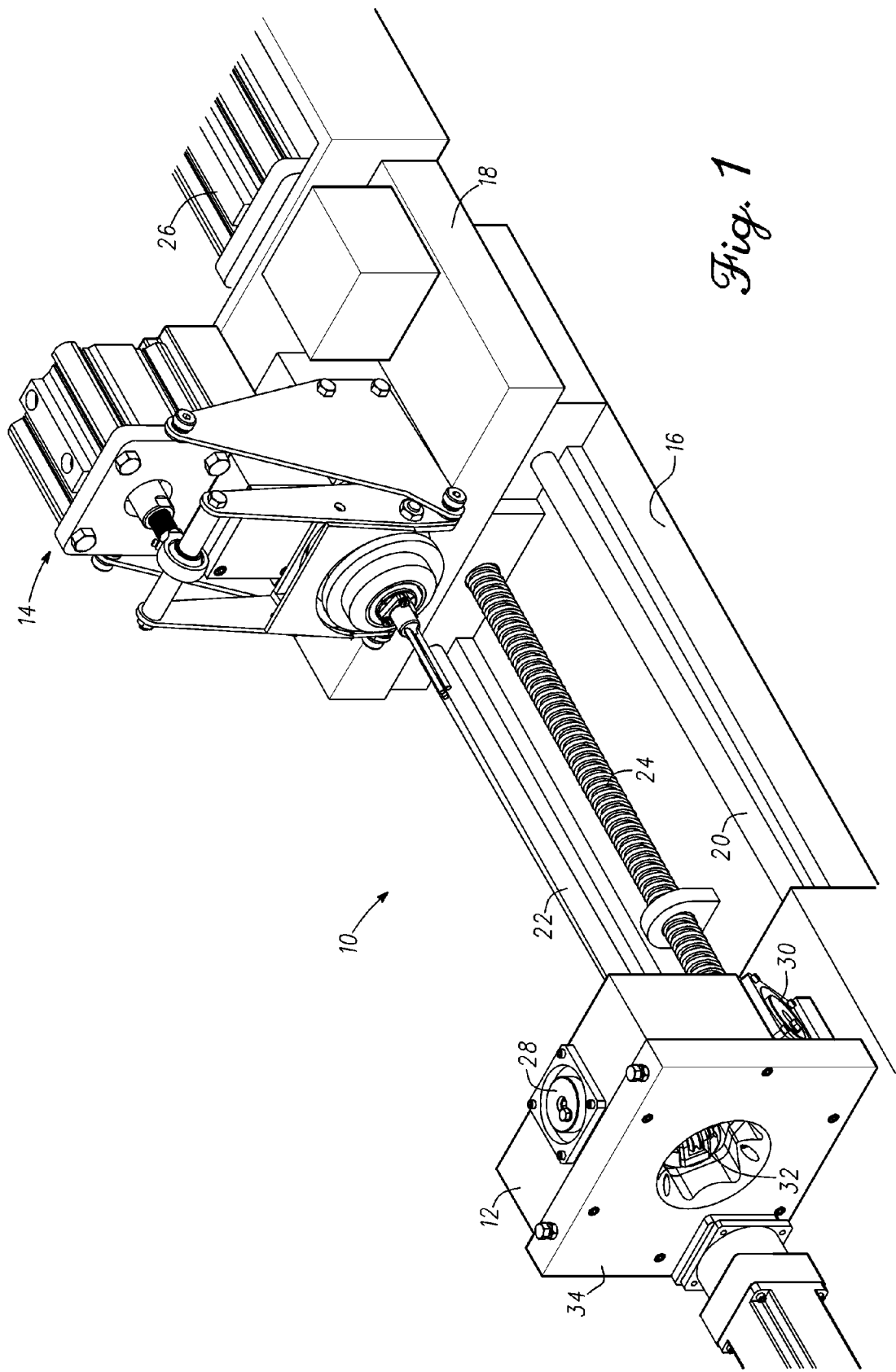
FIG. 1 is a front perspective view of a bending apparatus incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to the figures and in particular FIG. 1, an apparatus 10 incorporating features of the present invention comprises a bending die stock 12 and a collet stock 14. In the illustrative embodiment of FIG. 1, bending die stock 12 is rigidly mounted to a frame 16, while collet stock 14 is mounted to a carriage 18 which rides on a pair of rails 20, 22. Carriage 18 (and with it collet stock 14) is moved toward and away from bending die stock 12 by means of a lead screw 24 driven by lead screw motor 26.

Figure 2:
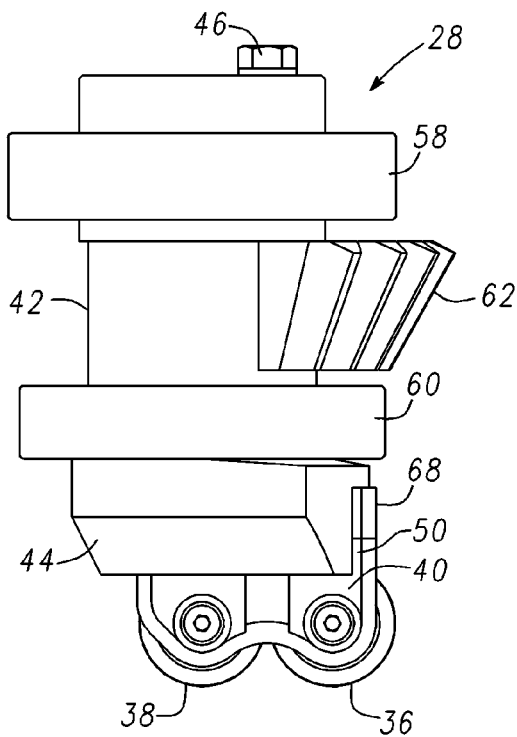
FIG. 2 is a side view of a bending head incorporated into the bending apparatus of FIG. 1.
Figure 3:
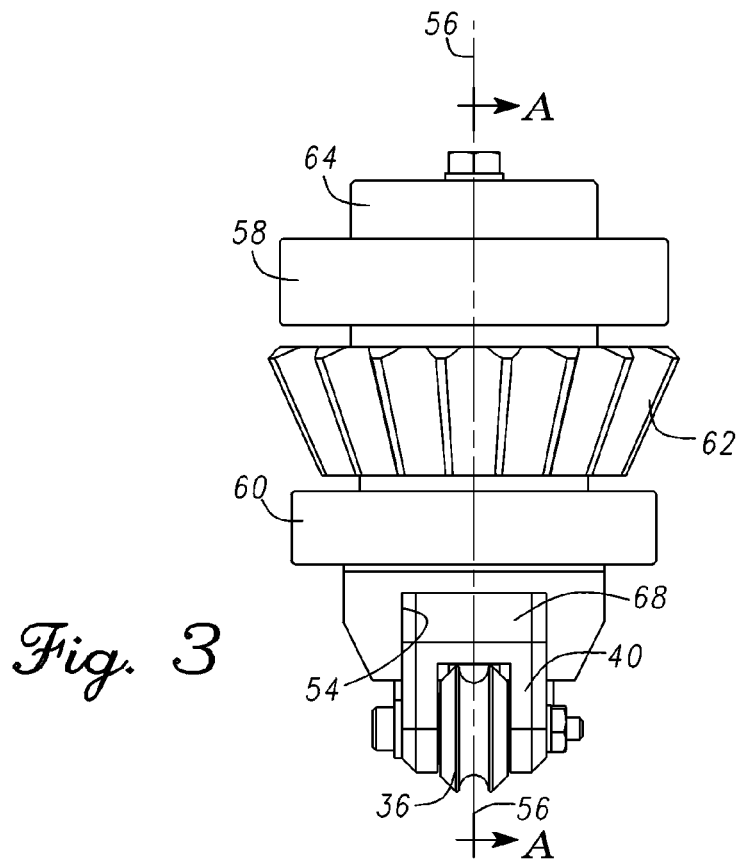
FIG. 3 is a front view of the bending head of FIG. 2.
Figure 4:
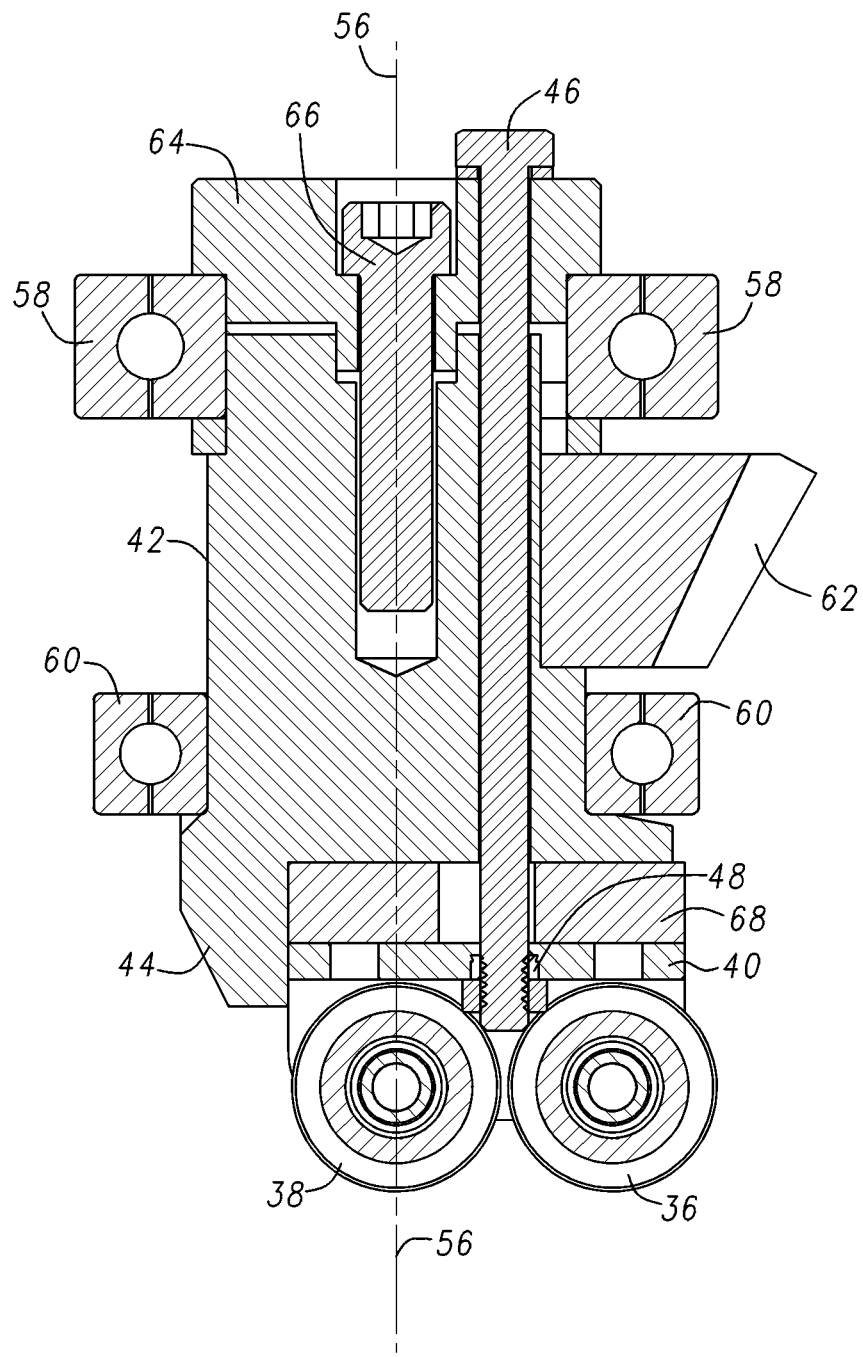
FIG. 4 is a cross-sectional view of the bending head of FIG. 3 taken along line A-A.

With additional reference to FIGS. 2-5, bending die stock 12 comprises three bending die heads 28, 30, 32 arranged in a radial array within housing 34 of bending die stock 12. With reference in particular to FIG. 2, bending die head 28 comprises a pressure die 36 and an alignment roller 38 each of which comprises a grooved pulley mounted for rotation to a roller support 40. Roller support 40 is attached to the shank 42 of bending head 28 at its lower (inward) end 44 by means of a threaded fastener 46 that extends through shank 42 to engage a threaded portion 48 of roller support 40. Shank 42 is supported for rotation about its longitudinal axis 56 by means of ball bearings 58, 60. Roller support 40 has an outer surface 50 that is substantially rectangular and is received in and keyed to a corresponding rectangular aperture 54 formed in the lower portion 44 of shank 42, so that roller support 40 (and with it die 36 and roller 38) are constrained to rotate with shank 42 about its longitudinal axis 56. A pinion gear 62, comprising a bevel gear sector, is rigidly attached to shank 42 between ball bearings 58 and 60. Cap 64 and bolt 66 positively locate bending die head 28 within housing 34. A spacer 68 is available in different thicknesses to allow the depth of roller support 40 relative to housing 34 to be adjusted to accommodate different helical radii and/or tube diameters. Bending die heads 30 and 32 are substantially identical in construction and therefore will not be discussed herein in detail.

Figure 5:
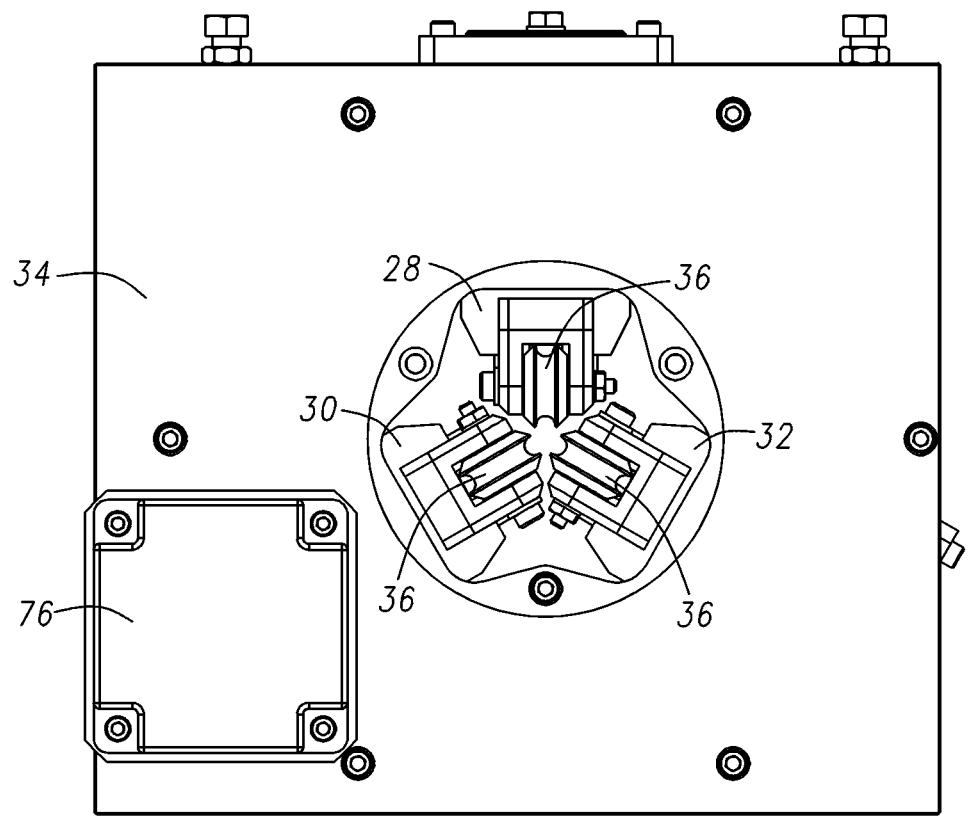
FIG. 5 is a front view of a bending die stock incorporated into the bending apparatus of FIG. 1.
Figure 6:
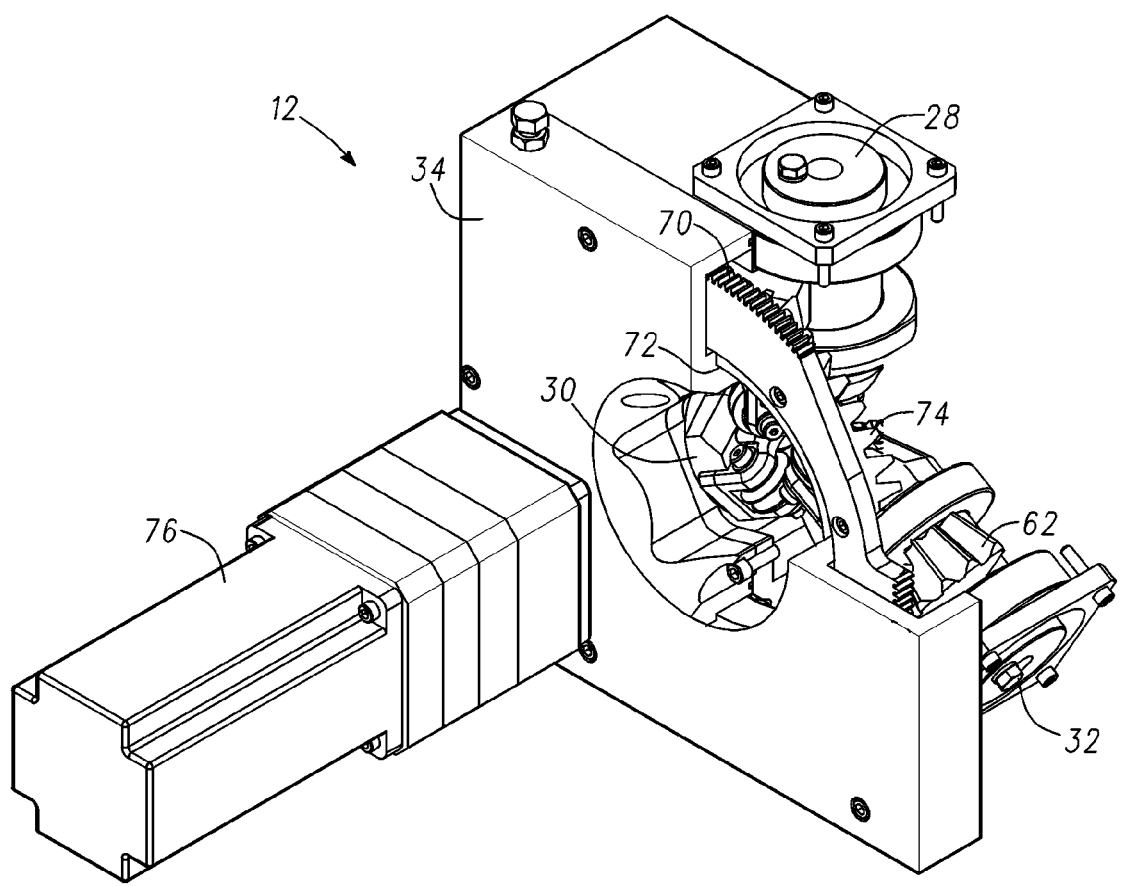
FIG. 6 is a perspective view of the bending die stock of FIG. 5 partially cut away to show internal details.

With additional reference to FIG. 6, bending die stock 12 further comprises a ring gear 70 mounted for rotation within housing 34 by means of bearing 72. Ring gear 70 is attached to a bevel gear 74 which simultaneously engages the pinion gears 62 of bending die heads 28, 30 and 32. A bending die motor 76, which can be a stepper or servo motor, engages ring gear 70 and is capable of rotating ring gear 70 in either direction so as to rotate bending die heads 28, 30 and 32 in unison from the position shown in FIG. 5 to a position for forming either a right-handed or a left-handed helical tube bundle. Alternatively, bending die heads 28, 30 and 32 can be rotated using individual stepper motors or other drive means.

Figure 7:
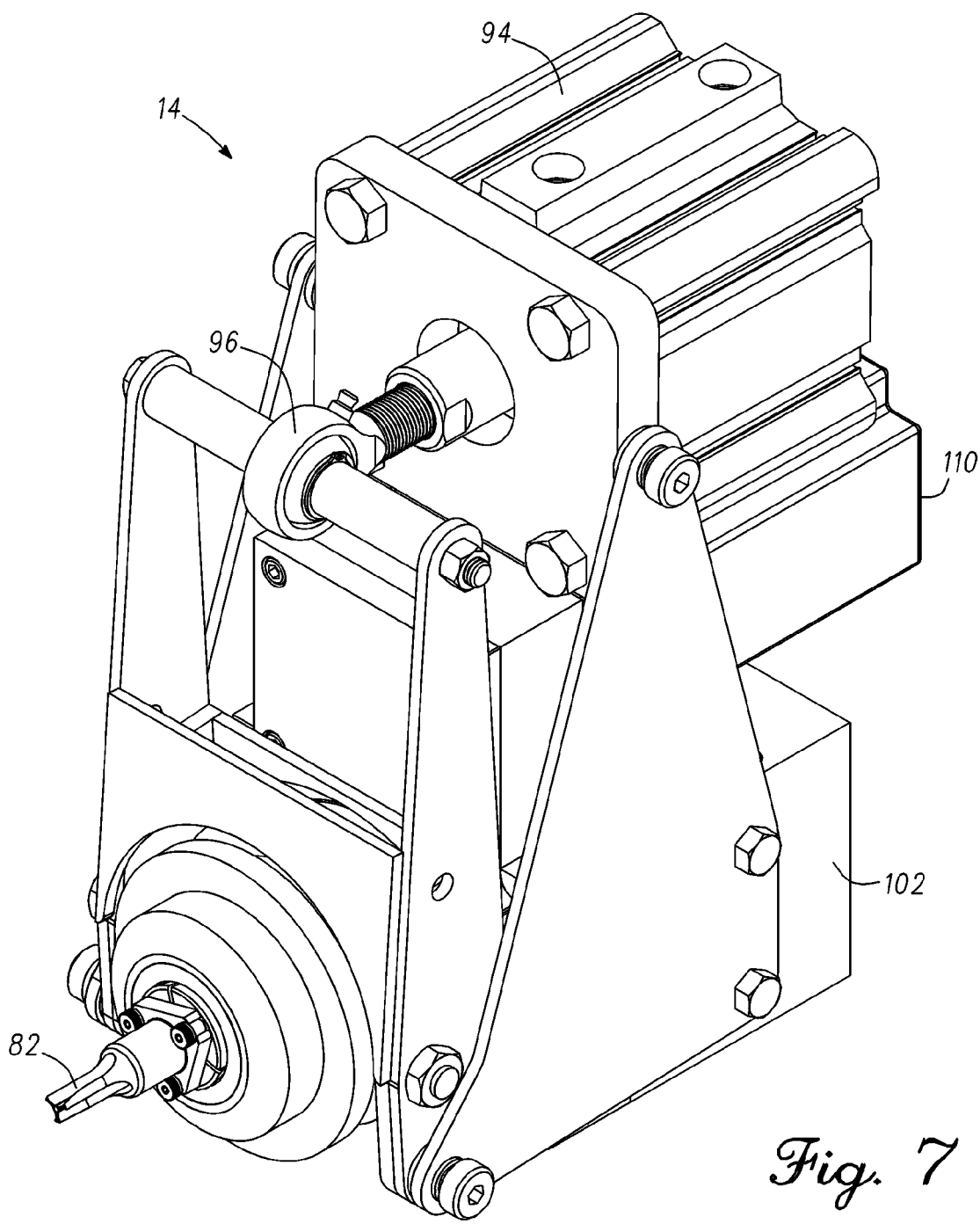
FIG. 7 is a front perspective view of a collet stock incorporated into the apparatus of FIG. 1.
Figure 8:
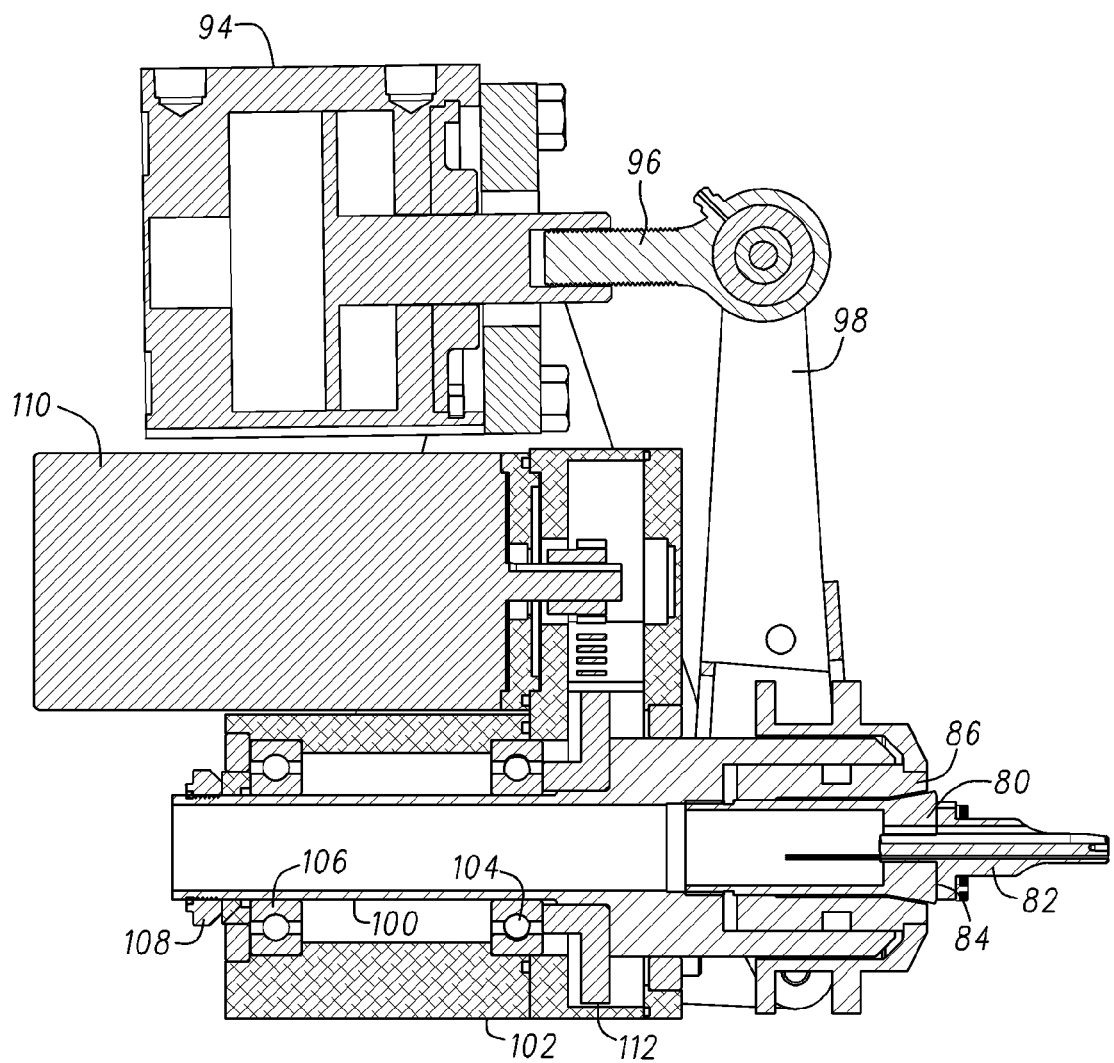
FIG. 8 is a cross-sectional view of the collet stock of FIG. 7.

Turning now to FIGS. 7 and 8, collet stock 14 comprises a collet 80 and a lead-in die 82 which is attached the face 84 of collet 80. Collet 80 includes a conventional tapered outside surface that operates against a tapered sleeve 86 which causes collet 80 to close down around lead-in die 82 as tapered sleeve 86 is moved from an opened position to a closed position. Collet 80 and lead-in die 82 cooperate to securely hold the tubes 88, 90, and 92 (FIG. 9) to be formed into the helical tube bundle. A pneumatic ram 94 operates a linear actuator arm 96, which moves an operating lever 98 to engage and disengage tapered sleeve 86 from collet 80.

Collet 80 is supported for rotation by a spindle 100 which is supported in the housing 102 by ball bearings 104, 106. A conventional spindle nut 108 positively locates the spindle in the axial direction within housing 102. Spindle 100 is rotated at a variable angular velocity by means of a spindle motor 110 which acts on a gear 112 which is attached to spindle 100.

Figure 9:
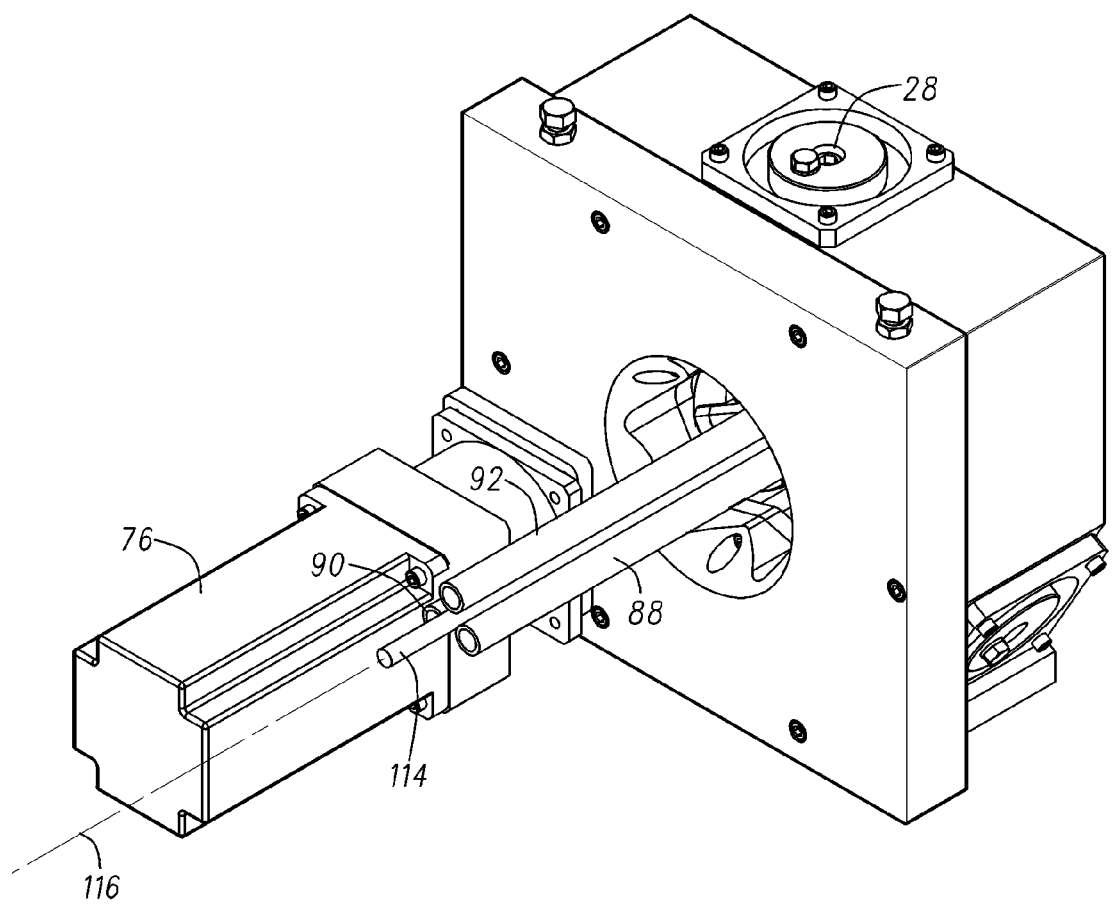
FIG. 9 is a perspective view of the bending die stock of FIG. 5 in an initial position.
Figure 10:
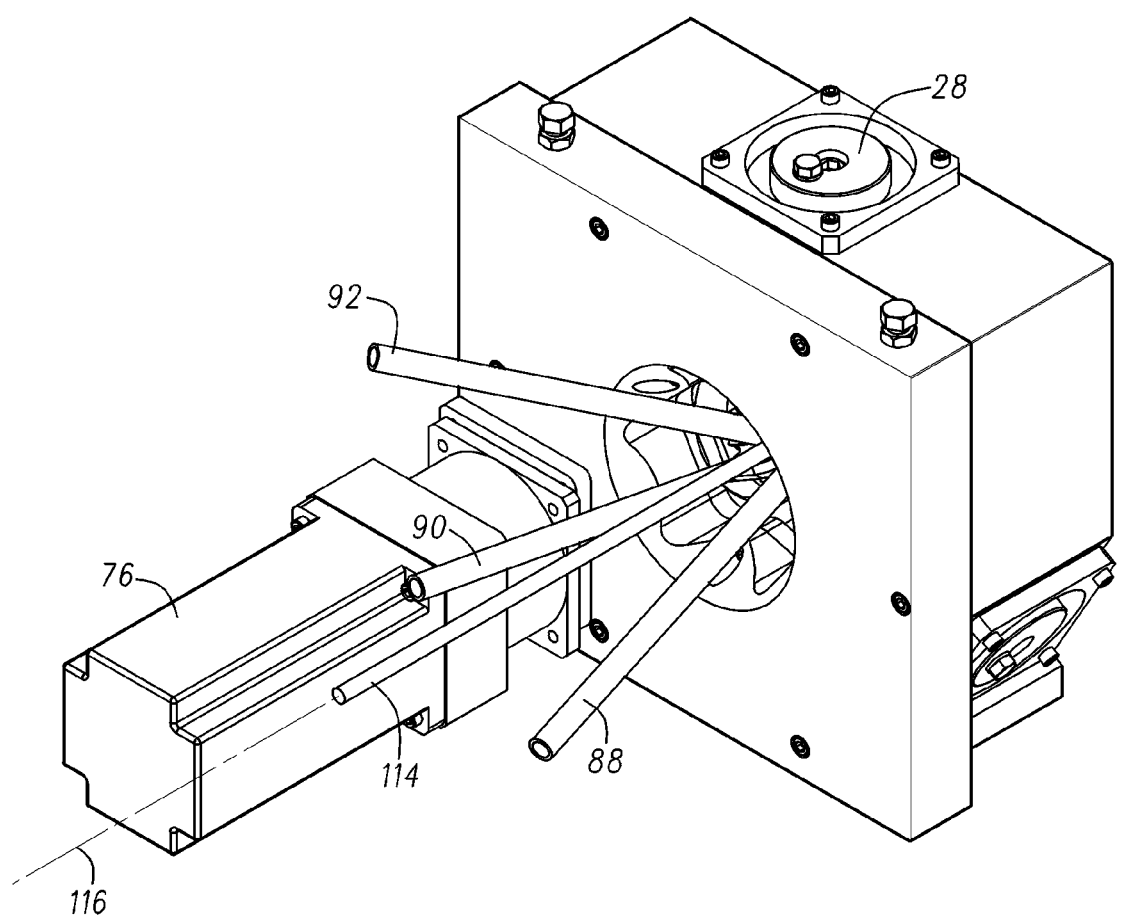
FIG. 10 is a perspective view of the bending die stock of FIG. 5 in a second position.

With additional reference to FIGS. 9 and 10, in operation, tubes 88, 90 and 92 are inserted into the apertures formed between collet 80 and lead-in die 82. Pneumatic ram 94 is then engaged to grip tubes 88, 90 and 92 firmly in collet 80. A cylindrical spacer 114 is then inserted into the space between tubes 88, 90 and 92. If not already in the proper orientation, in which the grooved pressure dies 36 and alignment rollers 38 are parallel to the longitudinal axes of tubes 88, 90 and 92 as shown in FIG. 5, bending die heads 28, 30 and 32 are moved into the proper orientation by engaging bending die motor 76. Lead screw motor 26 is then engaged to move carriage 18 toward bending die stock 12 until it is at the appropriate distance for forming the lead-in of the helix.

Bending die motor 76 is then engaged to begin forming the lead-in of the helix by rotating bending die heads 28, 30 and 32 from their initial positions (0°) to a position (θ°) in which the grooves in pressure dies 36 and alignment rollers 38 are skewed from the longitudinal axis 116 of the tube bundle being formed. Simultaneously, lead screw motor 26 and spindle motor 110 rotate and translate collet 80 away from bending die stock 12 to as required to form the initial portion of the helix. This causes the free ends of tubes 88, 90 and 92 to become splayed as shown in FIG. 10. This lead-in maneuver bends the tubes tangentially to the cylindrical spacer 114 by applying force through pressure dies 36 in a direction axial to the pressure die bearings. This is done over a distance as in a roll bend operation, bending the tube to the lead-in radius. If it were not done over a distance it would be a zero radius bend and the tube would kink. This distance is in the longitudinal travel of the carriage 18. Because the helix has moved in the longitudinal direction, the rotational orientation of the helix must be calculated and accounted for. This can be illustrated graphically by wrapping a 2D angular position profile of the bend head around a cylinder with a diameter equal to the helix diameter. The lead-in section of the bent tube is a complicated curve of a variable-pitch helix going from a helix angle of 0° to θ°.

Once the lead-in of the helix has been formed, bending die heads 28, 30 and 32 remain in a fixed orientation while lead screw motor 26 and spindle motor 110 rotate and translate collet 80 (and lead-in die 82) away from bending die stock 12 at a steady (or at least proportional) rate. This action draws tubes 88, 90 and 92 through bending die heads 28, 30 and 32 to form a helical bundle having a substantially constant helical pitch and helical radius. During this normal bending action, pressure dies 36 apply a reaction force in a direction radial to the bearings supporting the pressure die to bend tubes 88, 90 and 92 around cylindrical spacer 114. Tubes 88, 90 and 92 react against each other to statically balance all bending forces so that cylindrical spacer 114 does not deform. It would be possible to bend a single tube or rod with such a machine provided the helix diameter was large enough for a sufficiently strong center cylindrical spacer 114, as is common with existing tube coiling machines.

The third and last bend maneuver is the lead-out. Its end position is calculated and programmed in the same way as the lead-in, with the only difference being that the helical axis moves from the helical angle θ° to 0°. Sometimes the helical angle is programmed to travel past 0° to account for spring back in the tangential direction.

Spindle motor 110 rotating collet 80 provides the torque to bend tubes 88, 90 and 92 around cylindrical spacer 114. In testing it was determined that for longer, tighter helixes, this torque was too much for the formed helix bundle to transmit, and the tubes would begin to kink at the collet. Lead-in die 82 solves this problem. The lead-in die 82 is machined with the same lead-in radius profile as the tube profile to be bent. While this lead-in die improved the quality of the bend during the lead-in maneuver, its main purpose is to support the lead-in section of the formed tube during the bending of the helix body so that the lead in section cannot collapse or kink Although certain illustrative embodiments and methods have been disclosed herein, it will be apparent from the foregoing disclosure to those skilled in the art that variations and modifications of such embodiments and methods may be made without departing from the invention. For example, although in the illustrative embodiment the bending die stock is stationary and the collet stock moveable, the bending die stock could be mounted to a moveable carriage and the collet stock made stationary without departing from the scope of the invention. Similarly, although in the illustrative embodiment the collet is a conventional contracting collet, a collet assembly having multiple expanding collets, each gripping one of the tubes of the tube bundle is contemplated as being within the scope of the invention. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater, and as used herein, a step of "providing" a structural element recited in a method claim means and includes obtaining, fabricating, purchasing, acquiring or otherwise gaining access to the structural element for performing the steps of the method.

What is claimed is:

1. An apparatus for forming a plurality of tubes into a helical bundle, the apparatus comprising:
   a frame having a longitudinal axis;
   a collet stock assembly mounted to the frame, the collet stock assembly comprising a first housing supporting a collet and supporting a drive motor, the collet being supported by the housing for rotation about a central axis aligned substantially with the longitudinal axis of the frame, the drive motor operatively engaging the collet for rotating the collet at a predetermined rate about the central axis, the collet comprising a plurality of apertures for gripping said plurality of tubes;
   a bending die stock assembly mounted to the frame, the bending die stock assembly comprising a second housing supporting a plurality of bending heads, each of said plurality of bending heads comprising a rotatable shank having an inner end supporting a grooved alignment roller and a grooved bending roller; wherein the rotatable shanks are arranged in a radial array extending towards the central axis with the alignment rollers and bending rollers surrounding the central axis; each of the rotatable shanks being moveable between a first position in which the grooves formed in the alignment roller and the grooves formed in the bending roller are substantially aligned with the central axis and a second position in which the grooves formed in the alignment roller and the grooves formed in the bending roller are arranged at a predetermined helical angle with respect to the central axis;
   a first drive mechanism operatively attached to the rotatable shanks for simultaneously rotating the rotatable shanks from the first position to the second position; and
   a second drive mechanism engaging one of the collet stock assembly and the bending die stock assembly for moving one of the collet stock assembly and the bending die stock assembly linearly along the longitudinal axis of the frame as the drive motor simultaneously rotates the collet.

2. The apparatus of claim 1, wherein:
each of the rotatable shanks comprises an outer end, wherein each of the bending heads comprises a pinion gear attached to the rotatable shank between the inner end and the outer end.

3. The apparatus of claim 2, wherein:
the first drive mechanism comprises a ring gear engaging the pinion gears attached to the rotatable shanks and a motor for driving the ring gear.

4. The apparatus of claim 1, wherein:
the second drive mechanism comprises a lead screw and a drive motor for moving the collet stock assembly at a predetermined velocity.

5. The apparatus of claim 1, wherein:
each of said plurality of bending heads includes a removable spacer, which allows the depth of engagement of the alignment roller and the bending roller to be adjusted.

6. The apparatus of claim 1, wherein:
the first drive mechanism comprises individual stepper motors operatively attached to the rotatable shanks.

* * * * *